United States Patent [19]

Mayer et al.

[11] Patent Number: 5,734,133
[45] Date of Patent: Mar. 31, 1998

[54] MUFFLER FOR STRUCTURE-BORNE NOISE OF RUNNING WHEELS

[75] Inventors: Thomas Mayer, Sindelfingen; Klaus Zimmermann, München, both of Germany

[73] Assignee: Daimler-Benz Aerospace AG, Germany

[21] Appl. No.: 616,925

[22] Filed: Mar. 15, 1996

[30] Foreign Application Priority Data

Mar. 15, 1995 [DE] Germany ............... 195 09 389.5

[51] Int. Cl.$^6$ ..................................... F16F 15/00
[52] U.S. Cl. ................. 181/208; 181/209; 295/7; 105/452
[58] Field of Search ................. 181/207, 208, 181/209; 295/7; 105/452

[56] References Cited

U.S. PATENT DOCUMENTS 4,195,713  4/1980  Hagbjer et al. .............. 181/208 X
4,353,586  10/1982  Raquet et al. ................ 295/7
4,355,578  10/1982  Raquet ....................... 181/209 X
4,392,681  7/1983  Raquet ....................... 295/7

*Primary Examiner*—Khanh Dang
*Attorney, Agent, or Firm*—Evenson, McKeown, Edwards & Lenahan, P.L.L.C.

[57] ABSTRACT

A muffler for structure-borne noise of running wheels of different diameters and/or different frequency spectrums of structure-borne sound vibrations has vibration absorbing elements in the form of members which are arranged next to one another in the circumferential direction, forming a circular disk, and are each connected on the base surface in a force-locking manner with the running wheel. The muffler for structure-borne noise consists of at least a first type of vibration absorbing elements which is always the same for a larger range of running wheel diameters, and at least a second type of vibration absorbing elements which is adapted to the respective running wheel diameter and frequency spectrum of structure-borne sound vibrations.

6 Claims, 5 Drawing Sheets

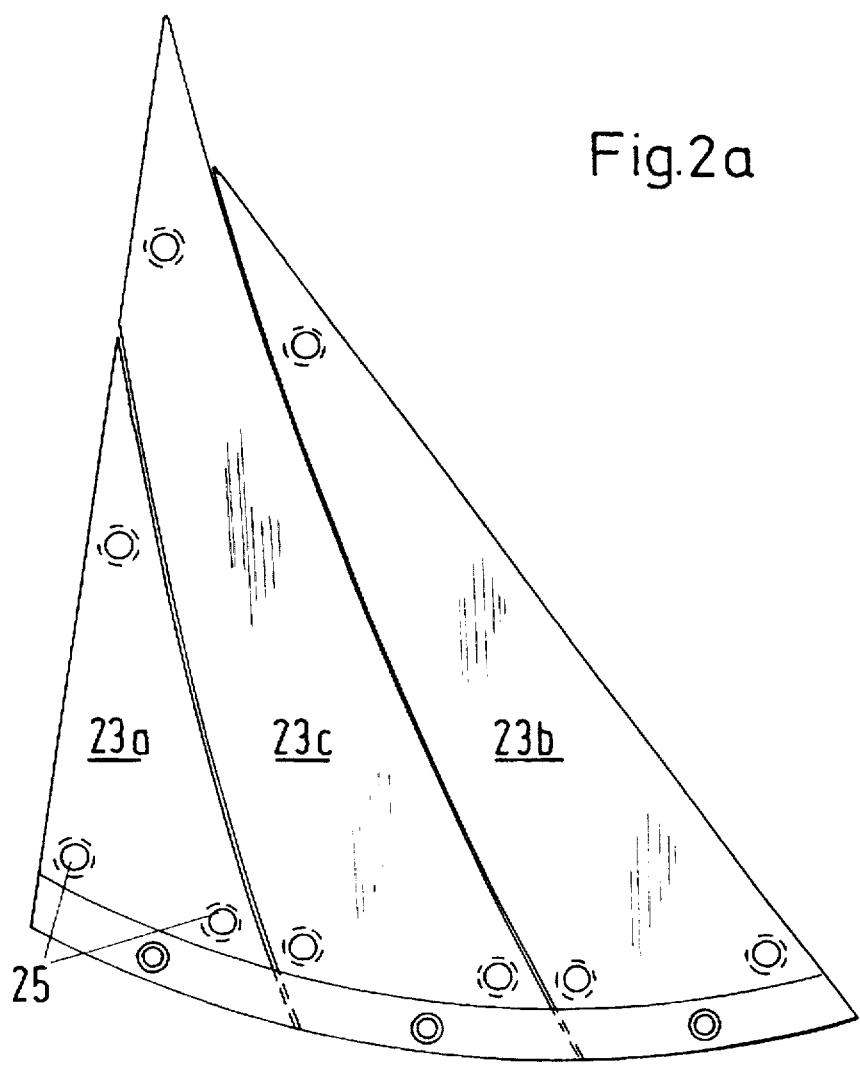

MUFFLER FOR STRUCTURE-BORNE NOISE OF RUNNING WHEELS

BACKGROUND AND SUMMARY OF THE INVENTION

This invention relates to a muffler for damping structure-borne noise of running wheels of different diameters, including different frequency spectrums of structure-borne sound vibrations. The invention, which is particularly useful for rail wheels, has roughly pie-shaped vibration damping elements which are circumferentially adjacent to one another and combine to form a circular disk. The damping elements are fixedly connected on the base surface of the running wheel.

German Patent Documents DE-OS 26 52 874 and DE 331 19 497 C2 disclose mufflers for structure-borne noise of this generic type. All of the individual damping elements which form a circular disk are identical, and are adapted to the respective wheel diameter.

Due to the large number of conventional rail wheel diameters, a separate type of vibration absorbing element is required for each of these wheels, and the manufacturing of correspondingly small quantities is not very productive.

Furthermore, it is necessary to adapt the individual absorbing elements to a limit frequency which is as low as possible, while the frequency range to be covered by the muffler for structure-borne noise is nevertheless wide. These requirements cause additional manufacturing problems.

It is therefore an object of the present invention to provide a muffler for structure-borne noise of the above-mentioned type which can be used on running wheels of different diameters, to damp different frequency spectrums of structure-borne sound vibrations, and can be produced at lower cost.

This object is achieved by the muffler for structure-borne noise according to the invention, which has at least two different types of vibration absorbing elements. The first type is effective for a large range of running wheel diameters and can therefore be standardized, while the second is adapted, expressly with respect to its length and vibration absorbing behavior, to the particular running wheel to which it is applied. Thus, at least one part of the muffler for structure-borne noise can be mass produced, and used universally.

Other objects, advantages and novel features of the present invention will become apparent from the following detailed description of the invention when considered in conjunction with the accompanying drawings.

DETAILED DESCRIPTION OF THE DRAWINGS

Figure 1A:
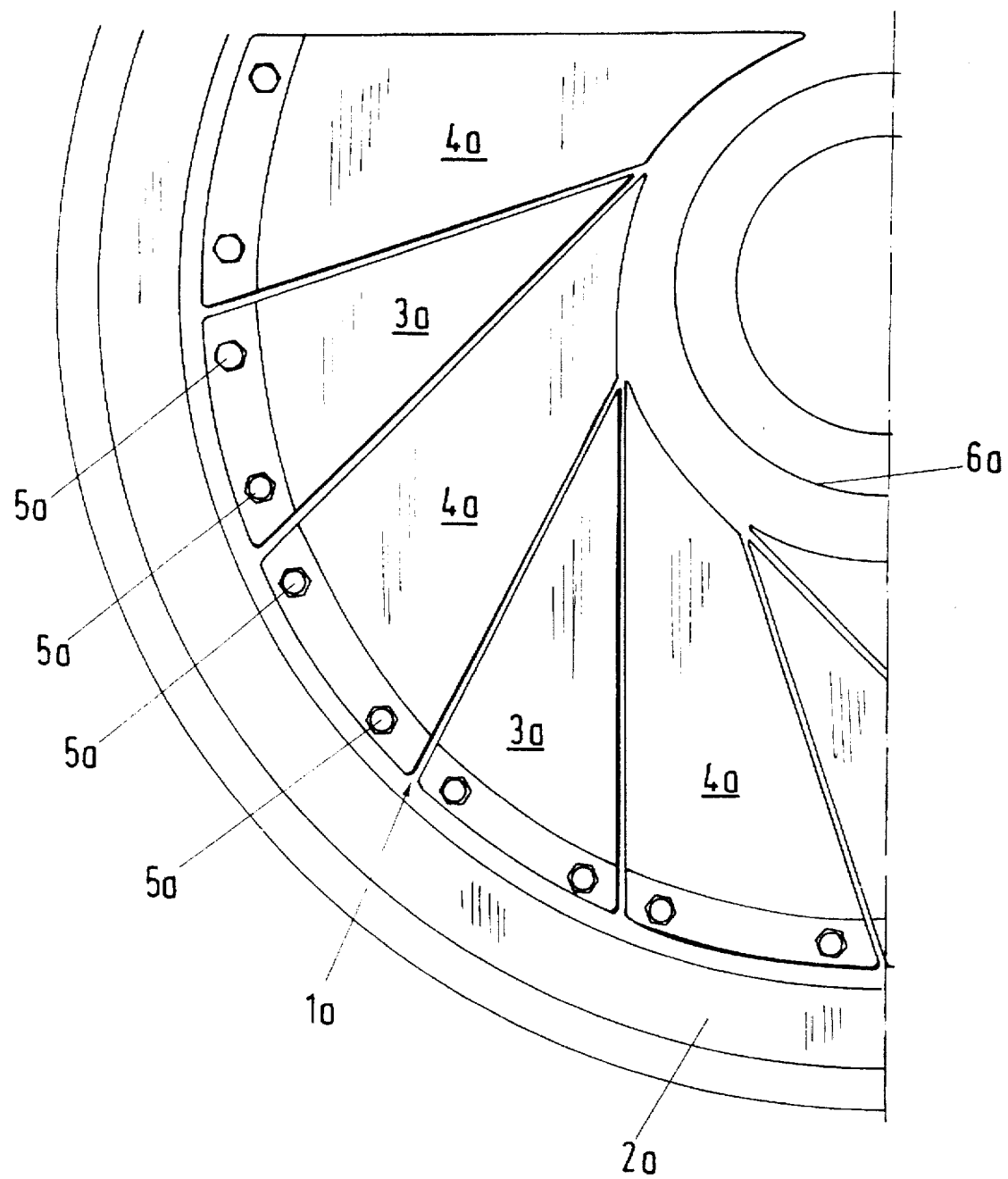
FIGS. 1a and b are lateral views of portions of two differently sized rail wheels, with a muffler for structure-born noise.
Figure 1B:
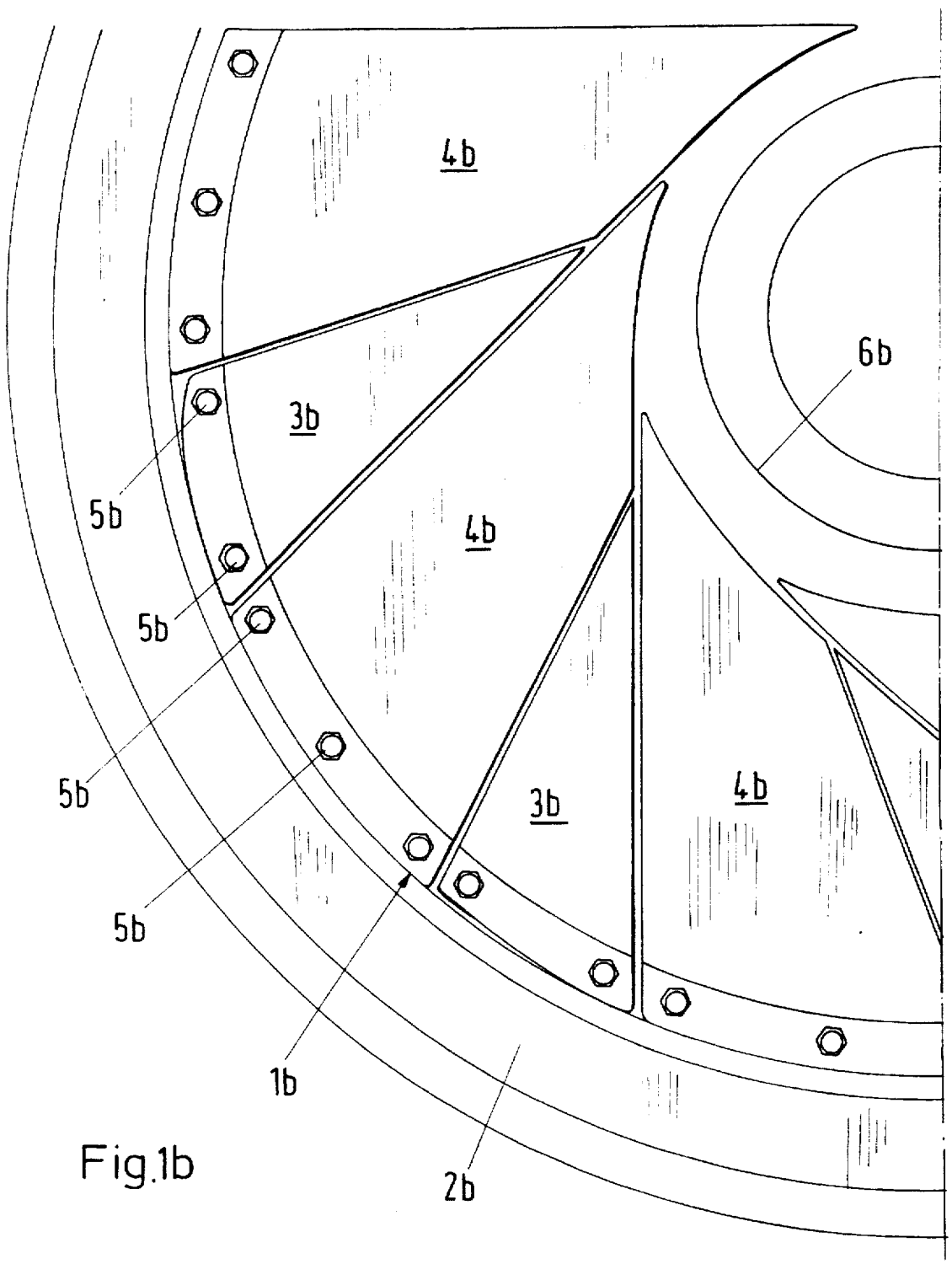

In the case of the embodiments illustrated in FIGS. 1a and b, the individual vibration absorbing elements 3a, 4a and 3b, 4b of the mufflers for structure-borne noise 1a, 1b are fastened on the inside of the wheel rim 2a and 2b of the rail wheels, and cover the largest portion of the wheel disk without contacting it. (The wheel depicted by way of example in FIGS. 1a and 1b is a conventional rail wheel, with the wheel rim 2a, 2b having an outermost periphery or running surface 6a, 6b and a flange 7a, 7b which guides the wheel on a track.)

The vibration absorbing elements 3a, 4a and 3b 4b comprise flat approximately pie-shaped vibration conducting members which are arranged circumferentially adjacent to one another and are covered, on one or both sides, by a damping mass in the form of a layer or coating of a vibration absorbing material. The base surface of each vibration absorbing element is fastened to the wheel rim 2a and 2b of the respective rail wheel by means of screws 5a and 5b and supporting plates 8a, 8b so that structure-born sound vibrations are coupled into the respective vibration absorbing elements only by way of the base surface.

Each muffler 1a and 1b is composed of two types of vibration absorbing elements. The first type consists of tapered parts 3a and 3b which are identical for both mufflers 1a and 1b. The second type of vibration absorbing elements 4a and 4b has a size and shape which is determined by the diameter of the respective rail wheel, with the end that is remote from the respective base surface being part of the internal radius of the circular disk-shaped muffler for structure-borne noise. The respective wheel axles 6a and 6b pass through this internal radius. The vibration absorbing elements 4a and 4b are also tapered, with their innermost tips being truncated and aligned essentially tangentially to the inside circle of the circular-ring disk. The orientation of the vibration absorbing elements 3a and 3b is a function of the wheel diameter and optimally utilizes the triangular space between two adjacent vibration absorbing elements 4a and 4b of the second type.

While the vibration absorbing elements 3a and 3b of the first type each absorb vibrations within an identical upper frequency range of structure-borne sound vibrations of the two rail wheels, the vibration absorbing elements 4a and 4b of the second type are adapted to a second lower frequency range which is a function particularly of the wheel diameter.

Figure 2B:
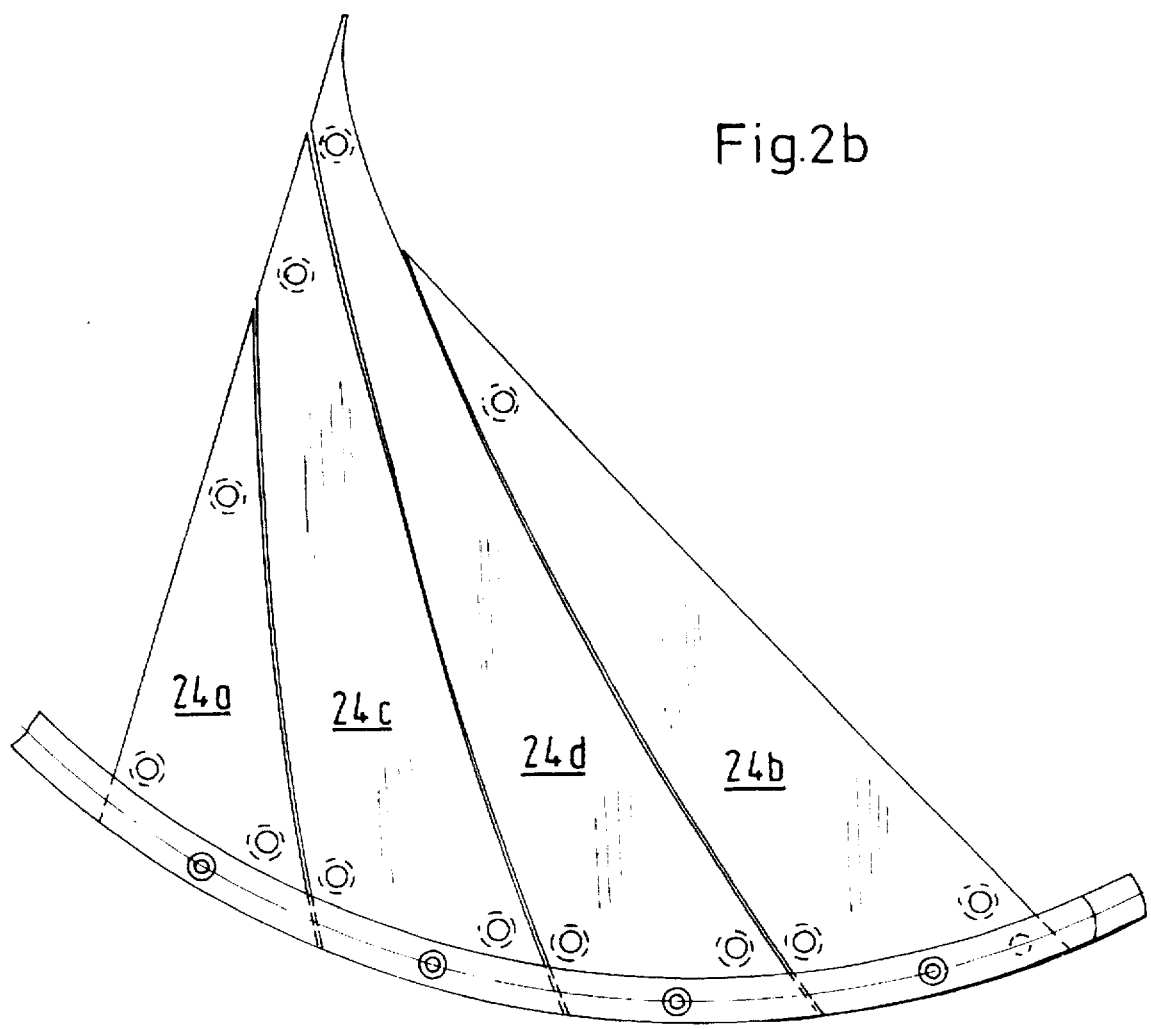
FIGS. 2a and b are views of portions of two differently sized segments of mufflers for structure-borne noise using identical vibration absorbing elements.
FIG. 2c shows two of the segments of FIG. 2a, arranged circumferentially adjacent to form a continuous circular arc.

FIGS. 2a and 2b each show vibration absorbing elements which combine to form a segment of a circular disk-shaped muffler for structure-borne noise for rail wheels of identical diameters, but with spectrally different structure-borne noise damping characteristics. The outer contour of both structure-borne vibration absorbing element is selected such that these segments can be arranged circumferentially adjacent to one another and fill the surface of a circular-ring disk without gaps. (See FIG. 2c.) The vibration absorbing elements according to FIG. 2a consists of three flat vibration conducting members 23a, 23b and 23c which, as in the embodiment according to FIGS. 1a and 1b, are connected at their base surfaces in a force-locking manner with the wheel rim of the respective rail wheel. Each of these segment sections 23a to 23c consists of two metal plates with a damping layer in between. In at least one of the two metal plates 25 elevations are impressed which are used as spacers between the two metal sheets and ensure a uniform thickness of the damping mass situated therebetween. The length and the taper ratio of all three vibration absorbing elements differ, and therefore also the frequency range in which these operate.

Figure 2C:
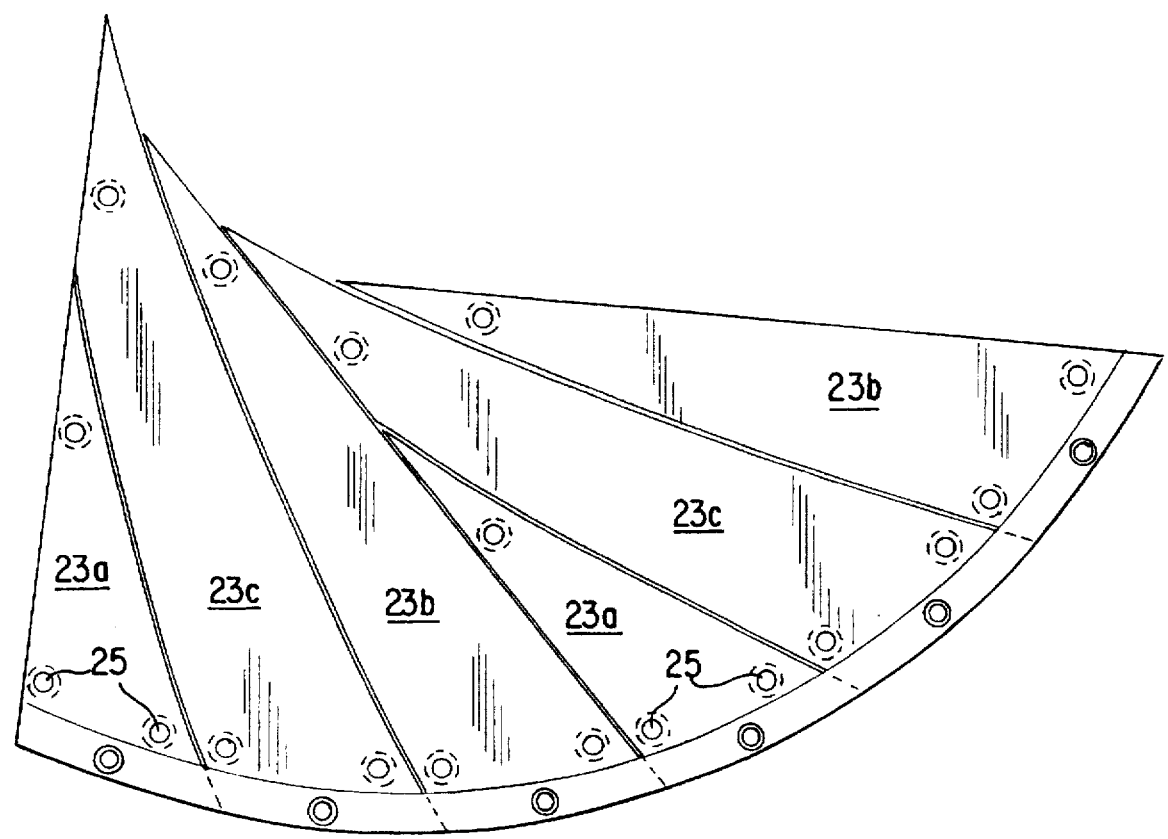

FIG. 2c shows how contiguous segments of this type shown in (for example) FIG. 2a combine circumferentially to form a continuous circular arc.

The structure-borne noise damping segment according to FIG. 2b consists of four horn-part-shaped vibration absorbing elements 24a to 24d arranged next to one another, the exterior vibration absorbing elements 24a and 24b being identical to the vibration absorbing elements 23a and 23b from FIG. 2a. The vibration absorbing elements 24c and 24d situated in-between fill a larger space than the vibration absorbing elements 23c from FIG. 2a and, in addition, are adapted to different frequency ranges. In this manner, mufflers for structure-borne noise of the same diameter while using similar components can also be adapted to different frequency ranges.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for absorbing structure-borne noise of varying frequency spectra for running wheels of different diameters, having substantially flat vibration absorbing elements arranged circumferentially adjacent to one another, collectively forming a circular disk, each of said vibration absorbing elements being lockingly connected with a running wheel on a base surface thereof, said apparatus comprising:

at least a first type of vibration absorbing elements having a predetermined size and shape which is independent of a diameter of the running wheel; and at least a second type of vibration absorbing elements having a size and shape which are selected as a function of the diameter of the running wheel and a frequency spectrum of structure-borne sound vibrations in said running wheel.

2. Apparatus according to claim 1, wherein arrangement of the vibration absorbing elements of both types circumferentially adjacent to one another forms a pattern covering a circular surface.

3. Apparatus according to claim 1 wherein end portions of the second type of vibration absorbing elements are truncated in an arc, and aligned essentially tangentially to an inside circle of the circular disk.

4. Apparatus according to claim 1 wherein at least one vibration absorbing element of each of the first and of the second types combine to form a segment of said circular ring disk.

5. Apparatus according to claim 4 wherein each segment of said circular ring disk comprises two vibration absorbing elements of the first type, with at least one vibration absorbing element of the second type arranged therebetween.

6. Apparatus according to claim 1 wherein a radial dimension of vibration absorbing elements of the second type is greater than a corresponding radial dimension of a vibration absorbing elements of the first type.

* * * * *